US012083807B2

(12) United States Patent
Matsunaga

(10) Patent No.: US 12,083,807 B2
(45) Date of Patent: Sep. 10, 2024

(54) PRINTING APPARATUS AND PRINTING METHOD

(71) Applicant: Seiko Epson Corporation, Tokyo (JP)

(72) Inventor: Hirotaka Matsunaga, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/653,068

(22) Filed: Mar. 1, 2022

(65) Prior Publication Data

US 2022/0281251 A1 Sep. 8, 2022

(30) Foreign Application Priority Data

Mar. 4, 2021 (JP) ................................ 2021-034155

(51) Int. Cl.
*B41J 29/393* (2006.01)
*B41J 2/21* (2006.01)
*B41J 11/00* (2006.01)

(52) U.S. Cl.
CPC ........... *B41J 29/393* (2013.01); *B41J 2/2135* (2013.01); *B41J 11/0095* (2013.01)

(58) Field of Classification Search
CPC .... B41J 11/0095; B41J 2/2135; B41J 29/393; B41J 11/0065; B41J 2/185; B41J 29/38; B41J 2/16508; B41J 2/16505
See application file for complete search history.

(56) References Cited

U.S. PATENT DOCUMENTS

2003/0081057 A1 5/2003 Isono et al.
2005/0200680 A1* 9/2005 Uchida ................ B41J 11/0095 347/104

FOREIGN PATENT DOCUMENTS

JP 2003-112416 4/2003
JP 2007-118513 5/2007

* cited by examiner

*Primary Examiner* — Jannelle M Lebron
(74) *Attorney, Agent, or Firm* — WORKMAN NYDEGGER

(57) ABSTRACT

Provided is a printing apparatus in which: a platen includes a plurality of contact portions configured to be brought into contact with a printing medium to support the printing medium, and a plurality of non-contact portions configured not to be brought into contact with the printing medium; the plurality of contact portions are disposed at positions differing from each other in a transport direction, and are each provided between the non-contact portions; and when performing marginless printing for discharging ink to an end portion, in the transport direction, of the printing medium, a control unit changes an area of a nozzle used in the marginless printing to any of a plurality of nozzle areas corresponding respectively to the plurality of non-contact portions in the transport direction, in accordance with deposit information indicating the amount of deposits of the ink at the non-contact portions.

8 Claims, 8 Drawing Sheets

PRINTING APPARATUS AND PRINTING METHOD

The present application is based on, and claims priority from JP Application Serial Number 2021-034155, filed on Marc 4, 2021, the disclosure of which is hereby incorporated by reference herein in its entirety.

BACKGROUND

1. Technical Field

The present disclosure relates to a printing apparatus and a printing method.

2. Related Art

It is known that an inkjet printer performs so-called marginless printing in which printing is performed in a manner such that no margin is provided at four sides of a sheet (see JP-A-2003-112416). When ink is discharged to an end portion of the sheet to perform the marginless printing in this manner, printing is performed while discarding the ink to the outside of the sheet. In addition, in order to receive the ink discarded to the outside of the sheet, an ink absorbing member or the like is disposed at a long groove formed at a transport path for the sheet to achieve a scheme in which the discarded ink is absorbed by the ink absorbing member.

However, in some cases, a portion of the ink discarded to the ink absorbing member is not absorbed by the ink absorbing member due to the portion of the ink being solidified or the like within the groove, and accumulates on the ink absorbing member. Then, when the marginless printing is repeatedly performed, deposits of the ink grow. Once the deposits reach the position of the sheet, the deposits are brought into contact with the sheet, which makes the sheet gets dirty. Thus, there is a demand for an idea that can prevent a medium from getting dirty due to the growth of deposits.

SUMMARY

A printing apparatus includes a platen configured to support a printing medium, a transport unit configured to transport the printing medium in a transport direction, a printing head including a plurality of nozzles configured to discharge ink to the printing medium supported by the platen, a scanning portion configured to move the printing head in a main scanning direction intersecting the transport direction, and a control unit configured to control the transport unit, the printing head, and the scanning portion, in which the platen includes a plurality of contact portions configured to be brought into contact with the printing medium to support the printing medium, and a plurality of non-contact portions configured not to be brought into contact with the printing medium, the plurality of the contact portions of which positions differ from each other in the transport direction are each provided between the non-contact portions, and when performing marginless printing for discharging ink to an end portion, in the transport direction, of the printing medium, the control unit changes areas of the nozzles used in the marginless printing to any of a plurality of nozzle areas corresponding respectively to the plurality of non-contact portions in the transport direction in accordance with deposit information indicating an amount of the ink deposited at the non-contact portions.

A printing apparatus includes a platen configured to support a printing medium, a transport unit configured to transport the printing medium in a transport direction, a printing head including a plurality of nozzles configured to discharge ink to the printing medium supported by the platen, a scanning portion configured to move the printing head in a main scanning direction intersecting the transport direction, and a control unit configured to control the transport unit, the printing head, and the scanning portion, in which the platen includes a plurality of contact portions configured to be brought into contact with the printing medium to support the printing medium, and a plurality of non-contact portions configured not to be brought into contact with the printing medium, the plurality of the contact portions of which positions differ from each other in the transport direction are each provided between the non-contact portions, and when performing marginless printing for discharging ink to an end portion, in the transport direction, of the printing medium, the control unit changes areas of the nozzles used in the marginless printing to any of a plurality of nozzle areas corresponding respectively to the plurality of non-contact portions in the transport direction, the change being made for each page to be printed.

A printing method including discharging ink to a printing medium supported by a platen to perform printing by using a combination of transport of the printing medium in a transport direction and main scanning for moving a printing head in a main scanning direction intersecting the transport direction, the printing head including a plurality of nozzles configured to discharge the ink, in which the platen includes a plurality of contact portions configured to be brought into contact with the printing medium to support the printing medium, and a plurality of non-contact portions configured not to be brought into contact with the printing medium, the plurality of the contact portions of which positions differ from each other in the transport direction are each provided between the non-contact portions, and when marginless printing for discharging ink to an end portion, in the transport direction, of the printing medium is performed, areas of the nozzles used in the marginless printing are changed to any of a plurality of nozzle areas corresponding respectively to the plurality of non-contact portions in the transport direction, the change being made in accordance with deposit information indicating an amount of the ink deposited at the non-contact portions.

A printing method includes discharging ink to a printing medium supported by a platen to perform printing by using a combination of transport of the printing medium in a transport direction and main scanning for moving a printing head in a main scanning direction intersecting the transport direction, the printing head including a plurality of nozzles configured to discharge the ink, in which the platen includes a plurality of contact portions configured to be brought into contact with the printing medium to support the printing medium, and a plurality of non-contact portions configured not to be brought into contact with the printing medium, the plurality of contact portions of which positions differ from each other in the transport direction are each provided between the non-contact portions, and when marginless printing for discharging ink to an end portion, in the transport direction, of the printing medium is performed, areas of the nozzles used in the marginless printing are changed to any of a plurality of nozzle areas corresponding respectively to the plurality of non-contact portions in the transport direction, the change being made for each page to be printed.

DESCRIPTION OF EXEMPLARY EMBODIMENTS

Below, embodiments according to the present disclosure will be described with reference to the drawings. Note that the drawings are merely given as examples for the purpose of explaining the present embodiment. Since the drawings are given as examples, the ratio or shape may not be correct, or may be contradict to each other. Some items may not be illustrated.

1. Device Configuration

Figure 1:
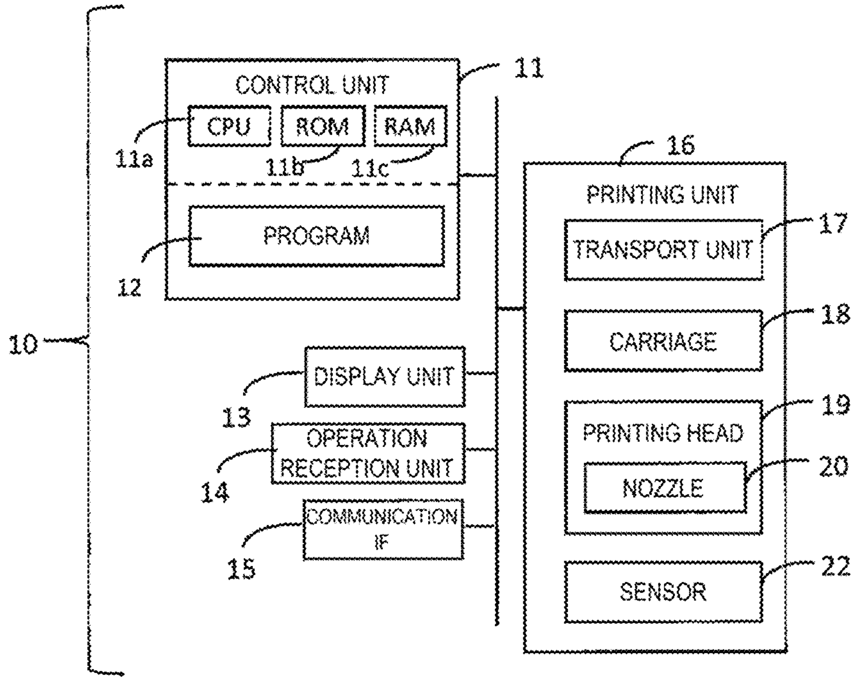
FIG. 1 is a block diagram illustrating a device configuration in a simplified manner.

FIG. 1 illustrates a configuration of a printing apparatus 10 according to the present embodiment in a simplified manner.

The printing apparatus 10 includes, for example, a control unit 11, a display unit 13, an operation reception portion 14, a communication IF 15, and a printing unit 16. The printing unit 16 includes, for example, a transport unit 17, a carriage 18, a printing head 19, and various types of sensors 22. The "IF" represents an interface. The control unit 11 is configured to include one or more ICs including a CPU 11*a* serving as a processor, a ROM 11*b*, a RAM 11*c*, and the like, and also include other nonvolatile memories or the like.

In the control unit 11, the processor, namely, the CPU 11*a* executes a computation process in accordance with one or more programs 12 stored in the ROM 11*b* or other memories by using the RAM 11*c* or the like as a work area, thereby controlling the printing apparatus 10. Note that the processor is not limited to one CPU, and may have a configuration in which a plurality of CPUs or hardware circuits such as an ASIC perform processing or may have a configuration in which the CPU and the hardware circuits work in a collaborative manner to perform processing.

The display unit 13 is a device for displaying visual information, and is configured, for example, by a liquid crystal display, an organic EL display, or the like. The display unit 13 may be configured to include a display and a drive circuit for driving the display. The operation reception portion 14 is a device for receiving an operation by a user, and is achieved, for example, by a physical button, a touch panel, a mouse, a keyboard, or the like. Of course, the touch panel may be achieved as a function of the display unit 13.

The display unit 13 and the operation reception portion 14 may be part of the configuration of the printing apparatus 10, or may be peripheral units externally coupled to the printing apparatus 10. The communication IF 15 is a generic term for one or a plurality of IFs for coupling the printing apparatus 10 with the outside in a wired or wireless manner, in accordance with a prescribed communication protocol including a known communication standard.

The printing unit 16 is a mechanism configured to perform printing of an ink jet type under control by the control unit 11.

The transport unit 17 is a unit used to transport a printing medium such as a sheet in a predetermined transport direction, and includes a roller and a motor that causes the roller or the like to rotate. The printing medium may be a medium made out of a base material other than paper, provided that the printing medium is a medium on which printing can be performed using a liquid. The upstream in the transport direction or the downstream in the transport direction may be simply referred to as upstream or downstream. The printing head 19 includes a plurality of nozzles 20. The printing head 19 discharges or stops discharging dots of a liquid such as ink from the nozzles 20 on the basis of print data generated by the control unit 11 and used to perform printing of an image, thereby performing printing of the image on the printing medium. For example, the printing head 19 can discharge each colored ink of a cyan (C) ink, a magenta (M) ink, a yellow (Y) ink, a black (K) ink, and the like. It is needless to say that the printing head 19 may discharge ink or a liquid with a color other than the CMYK.

The carriage 18 is a mechanism that can reciprocate along a predetermined main scanning direction with power received from a carriage motor that is not illustrated. The carriage 18 corresponds to a scanning portion. The main scanning direction intersects the transport direction. The term "intersect" as used herein means being perpendicular or being substantially perpendicular. The printing head 19 is mounted at the carriage 18. In other words, the printing head 19 together with the carriage 18 reciprocates along the main scanning direction.

Figure 2:
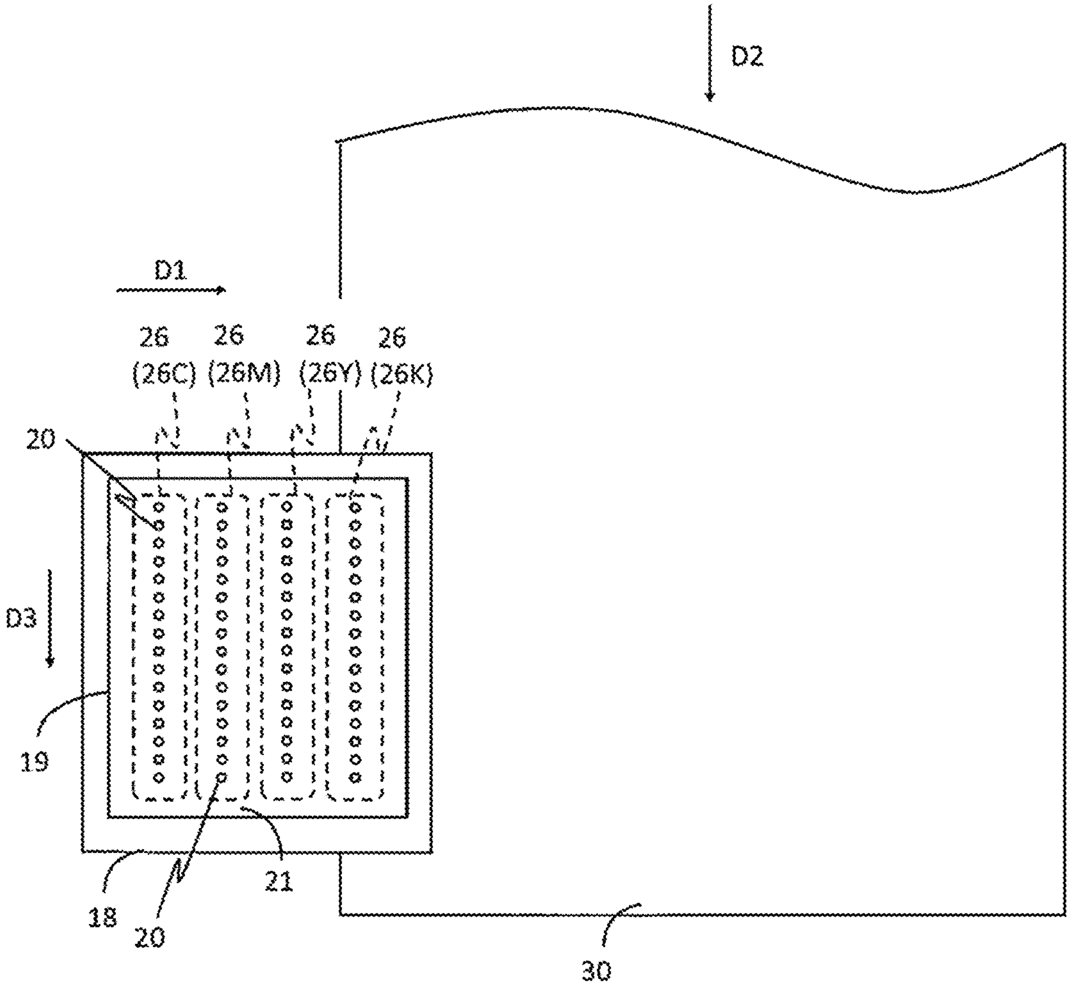
FIG. 2 is a diagram illustrating a relationship between a printing medium and a printing head or the like as viewed from above.

FIG. 2 illustrates a relationship between the printing medium 30 and the printing head 19 or the like in a simplified manner, as viewed from above. The printing head 19 mounted at the carriage 18 moves (first-half movement) from one end toward the other end in the main scanning direction D1 and moves (second-half movement) from the other end toward the one end, in conjunction with the carriage 18.

FIG. 2 illustrates an example of array of the nozzles 20 at a nozzle surface 21. The nozzle surface 21 is a lower surface of the printing head 19. Individual small circles in the nozzle surface 21 represent the nozzles 20. The printing head 19 has a configuration in which inks of individual colors are supplied from a liquid holding unit not illustrated and called an ink cartridge or ink tank or the like to discharge them from the nozzles 20, and includes a nozzle row 26 for each ink color. FIG. 2 illustrates an example of the printing head 19 configured to discharge the CMYK inks. A nozzle row 26 comprised of nozzles 20 that discharge the C ink is a nozzle row 26C. Similarly, a nozzle row 26 comprised of nozzles 20 that discharge the M ink is a nozzle row 26M. A nozzle row 26 comprised of nozzles 20 that discharge the Y ink is a nozzle row 26Y. A nozzle row 26 comprised of nozzles 20 that discharge the K ink is a nozzle row 26K. The nozzle rows 26C, 26M, 26Y, and 26K are arranged along the main scanning direction D1.

Each of the nozzle rows 26 is comprised of a plurality of nozzles 20 provided at constant nozzle pitches or substantially constant nozzle pitches that are gaps between nozzles 20 in a transport direction D2. A nozzle row direction D3 represents a direction in which the plurality of nozzles 20 constituting the nozzle row 26 are arranged. In the example in FIG. 2, the nozzle row direction D3 is parallel to the transport direction D2. In a case of the configuration in which the nozzle row direction D3 is parallel to the transport direction D2, the nozzle row direction D3 and the main scanning direction D1 are perpendicular to each other. However, configuration may be made such that the nozzle row direction D3 is not parallel to the transport direction D2 and obliquely intersects the main scanning direction D1.

An operation in which the printing head 19 discharges a liquid such as ink in association with the first-half movement of the carriage 18 in the main scanning direction D1 or an operation in which the printing head 19 discharges a liquid such as ink in association with the second-half movement of the carriage 18 in the main scanning direction D1 are referred to as main scanning or pass. The pass of the first-half movement may be referred to as first-half pass, and the pass of the second-half movement may be referred to as second-half pass. The printing unit 16 combines the pass and transport (hereinafter, referred to as "paper feed") of the printing medium 30 by the transport unit 17 in the transport direction D2 by a predetermined amount, thereby performing printing on the printing medium 30.

The configuration of the printing apparatus 10 illustrated in FIG. 1 may be achieved with one printer, or may be achieved with a plurality of devices coupled in a manner that they can communicate with each other.

In other words, the printing apparatus 10 may be substantially a printing system 10. For example, the printing system 10 includes a printing control device that functions as a control unit 11, and a printer that corresponds to the printing unit 16 controlled by the printing control device. A printing method according to the present embodiment is achieved with such a printing apparatus 10 or a printing system 10.

Figure 3:
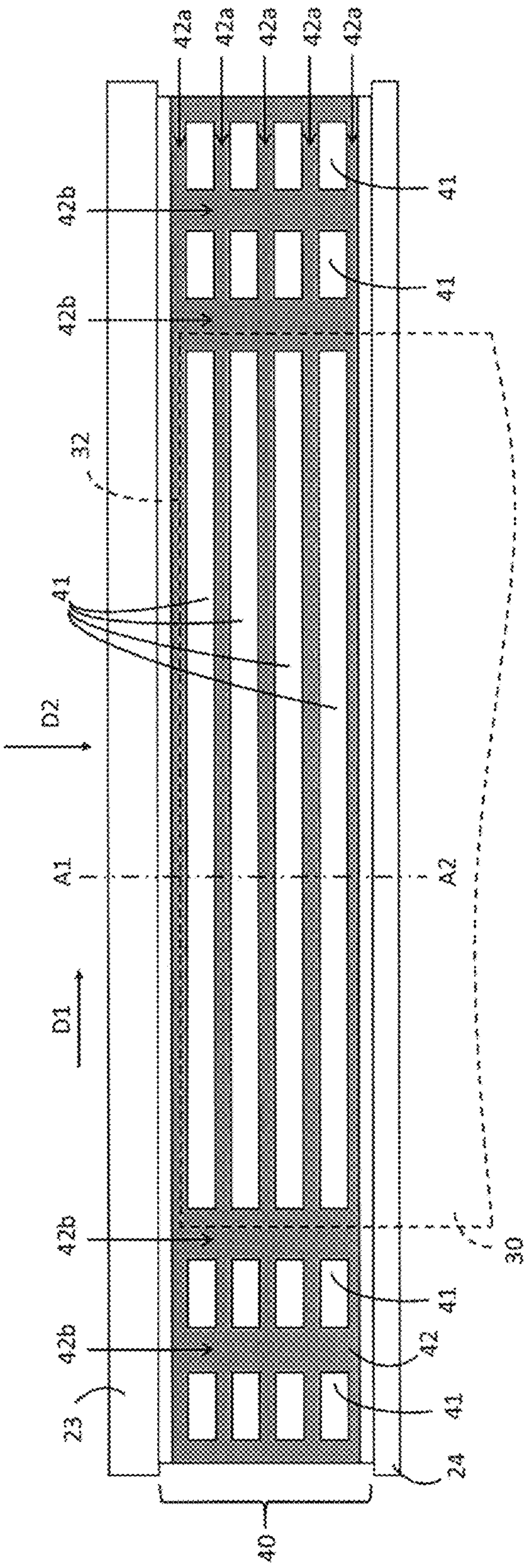
FIG. 3 is a diagram illustrating a platen and the like according to the present embodiment as viewed from above.

2. Explanation of Platen and Nozzle Area:

FIG. 3 schematically illustrates a platen 40 or the like according to the present embodiment and configured to support the printing medium 30, as viewed from above. The platen 40 is a portion of the transport path for the printing medium 30, the transport path being formed within the printing unit 16. In FIG. 3, the printing medium 30 is illustrated by the dashed line. The nozzle surface 21 of the printing head 19 is opposed to the platen 40 or the printing medium 30 supported by the platen 40. A transport roller 23 is disposed upstream of the platen 40. An emit roller 24 is disposed downstream of the platen 40.

The transport roller 23 and the emit roller 24 constitute a portion of the transport unit 17, and rotate with power of a motor to transport the printing medium 30 in the transport direction D2. Note that the transport roller 23 forms a pair with another roller that is not illustrated, and rotates in a state where the transport roller 23 and the other roller, both of which have a relationship of pair, sandwich the printing medium 30, thereby transporting the printing medium 30.

Similarly, the emit roller 24 forms a pair with another roller that is not illustrated, and rotates in a state where the emit roller 24 and the other roller, both of which have a relationship of pair, sandwich the printing medium 30, thereby transporting the printing medium 30.

The platen 40 includes a plurality of contact portions 41 configured to be brought into contact with the printing medium 30 to support the printing medium 30, and a plurality of non-contact portions 42 configured not to be brought into contact with the printing medium 30. In other words, the contact portions 41 are surfaces each configured to support the printing medium 30 between the transport roller 23 and the emit roller 24, and the non-contact portions 42 are grooves relative to such contact portions 41. In FIG. 3, the non-contact portions 42 in the area of the platen 40 are painted gray for the purpose of facilitating understanding. An ink absorbing body made out of a sponge or the like used to absorb a discarded ink is accommodated in the non-contact portion 42. Thus, the gray area in FIG. 3 may be understood to be an area where the ink absorbing body exists.

Of the non-contact portions 42, a plurality of grooves parallel to the main scanning direction D1 are each called a first groove 42*a*, and a plurality of grooves parallel to the transport direction D2 are each called a second groove 42*b*. In other words, the contact portions 41 are divided into plural pieces by the plurality of first grooves 42*a* and the plurality of second grooves 42*b*. Thus, the plurality of contact portions 41 are disposed at positions differing from each other in the transport direction D2, and are each provided between the non-contact portions 42.

The end at the downstream side of the printing medium 30 is referred to as a downstream end, and an end portion including the downstream end of the printing medium 30 is referred to as a downstream end portion. The "end portion" as used herein means a region of the printing medium 30 that extends from the end of the printing medium to a position that comes inside, for example, by several millimeters or by a dozen or so millimeters, and is a region of a blank space where no printing is performed in so-called margin-leaving printing. Similarly, the end at the upstream side of the printing medium 30 is referred to as an upstream end, and an end portion including the upstream end of the printing medium 30 is referred to as an upstream end portion. In FIG. 3, the upstream end 32 is indicated by using a reference number "32." In addition, the end of the printing medium 30 at the right side (hereinafter, referred to as "right") as viewed toward the transport direction D2 is referred to as a right end, and the end at the left side (hereinafter, referred to as "left") as viewed toward the transport direction D2 is referred to as a left end.

Furthermore, the end portion including the right end of the printing medium 30 is referred to as a right end portion, and the end portion including the left end is referred to as a left end portion.

The printing medium 30 is transported in the transport direction D2 at a position where the left end and the right end of the medium pass through individual second grooves 42*b* at the left side and the right side, respectively. With this configuration, the ink discharged to the outside of the printing medium 30 is discarded to the second grooves 42*b* at the time of performing the marginless printing to each of the left end portion and the right end portion. The size of the printing medium 30 used in the printing unit 16 is not necessarily the same size. Thus, the platen 40 includes the plurality of second grooves 42*b* formed at each of the left side and the right side. With this configuration, in a case of various sizes of the printing media 30 having different lengths (widths) in the main scanning direction D1, the left end and the right end of the medium can pass through any of the second grooves 42*b* at either left side or right side.

In the present embodiment, at the time of performing the marginless printing to the downstream end portion of the printing medium 30, printing is performed in a state where the downstream end is positioned at any of the plurality of first grooves 42*a*. In addition, at the time of performing the marginless printing to the upstream end portion of the printing medium 30, printing is performed in a state where the upstream end is positioned at any of the plurality of first grooves 42*a*. With this configuration, at the time of performing the marginless printing to each of the downstream end portion and the upstream end portion, the ink discharged to the outside of the printing medium 30 is discarded to the first grooves 42*a*.

Figure 4:
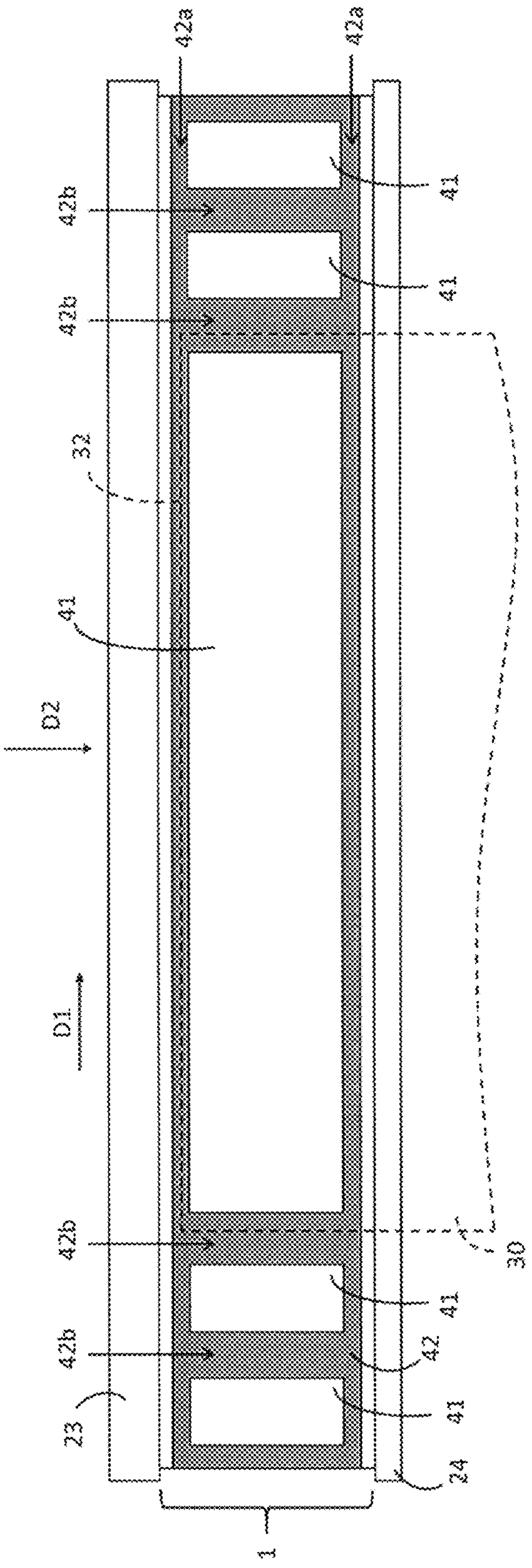
FIG. 4 is a diagram illustrating a typical platen or the like as viewed from above.

FIG. 4 illustrates a typical platen 1 or the like as viewed from above in a simplified manner, and is given to make comparison with that illustrated in FIG. 3. For FIG. 4, a difference from FIG. 3 will be mainly described. As can be understood from FIG. 4, the typical platen similarly includes a plurality of second grooves 42*b* at each of the left side and the right side. In related arts, as illustrated in FIG. 4, the first grooves 42*a* are formed only at two locations, that is, in the vicinity of the transport roller 23 disposed upstream and in the vicinity of the emit roller 24 disposed downstream. In other words, in FIG. 4, there is no concept concerning the plurality of contact portions 41 each provided between the non-contact portions 42 and disposed at positions differing from each other in the transport direction D2. In related arts, a positional relationship between the first grooves 42*a* and the downstream end is fixed at the time of performing the marginless printing to the downstream end portion of the printing medium 30, and a positional relationship between the first grooves 42*a* and the upstream end is also fixed at the time of performing the marginless printing to the upstream end portion of the printing medium 30.

Figure 5A:
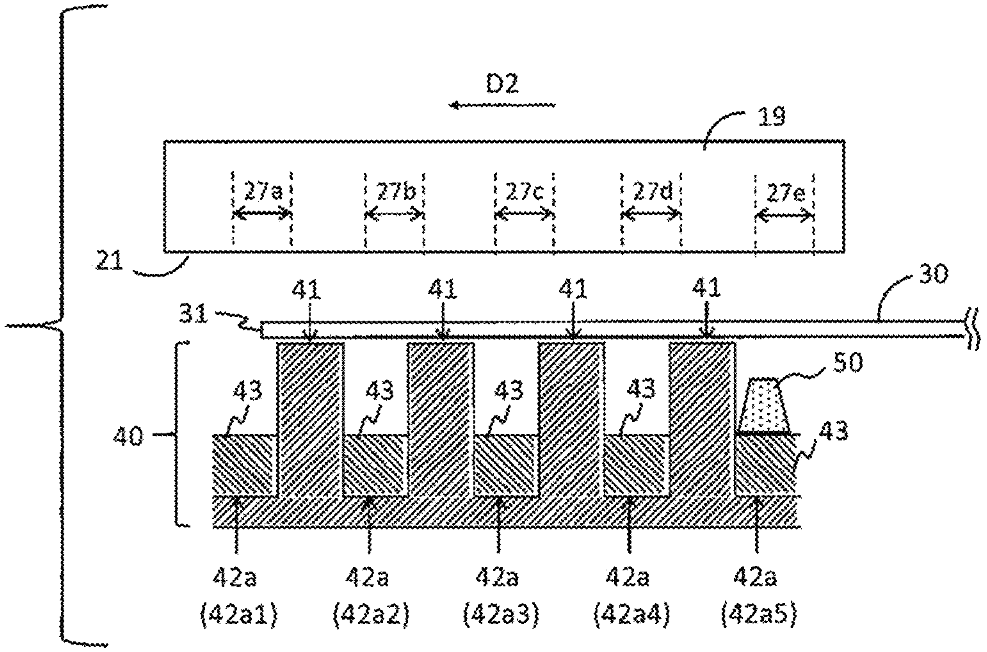
FIG. 5A is a diagram illustrating a relationship or the like between a platen and nozzle areas that can be used in marginless printing toward a downstream end portion of a printing medium, as viewed in a direction parallel to a main scanning direction.
Figure 5B:
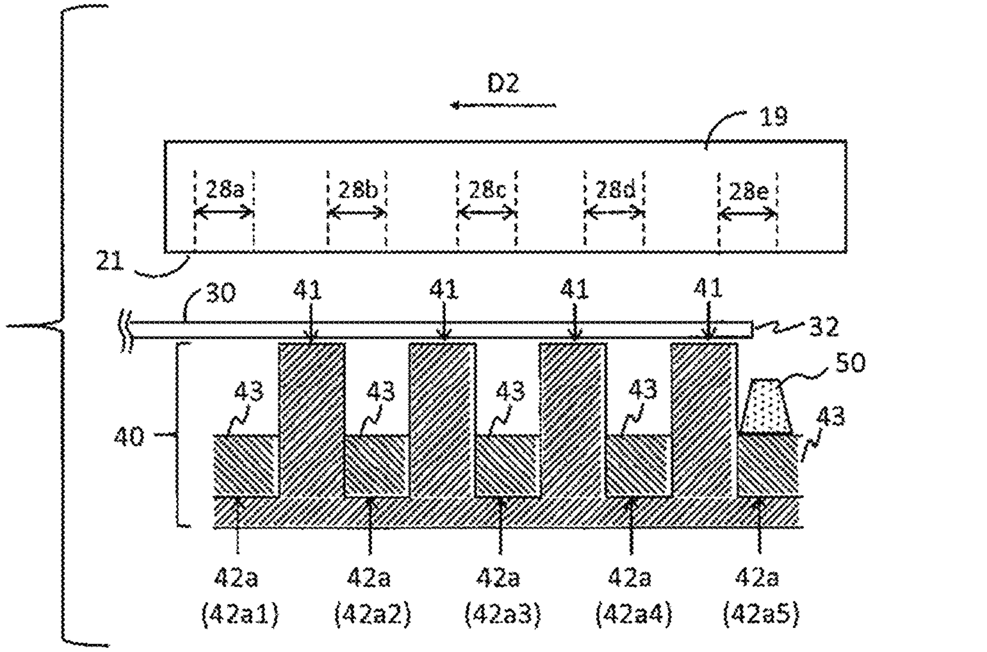
FIG. 5B is a diagram illustrating a relationship or the like between a platen and nozzle areas that can be used in marginless printing toward an upstream end portion of a printing medium, as viewed in a direction parallel to the main scanning direction.

FIGS. 5A and 5B each illustrate a relationship or the like between the platen 40 according to the present embodiment and nozzle areas of the printing head 19 in a simplified manner as viewed in a direction parallel to the main scanning direction D1. FIGS. 5A and 5B each illustrate a cross-section of the platen 40 taken along the line A1-A2 in FIG. 3. In the example in FIGS. 5A and 5B, the platen 40 includes first grooves 42*a* formed at five locations. These five first grooves 42*a* are referred to as first grooves 42*a*1, 42*a*2, 42*a*3, 42*a*4, and 42*a*5 in the order from the downstream side toward the upstream side. The ink absorbing body 43 is accommodated in the first grooves 42*a*1, 42*a*2, 42*a*3, 42*a*4, and 42*a*5.

In FIGS. 5A and 5B, the length of the printing head 19 in the transport direction D2 may be simply understood to be the length of the nozzle row 26 in the transport direction D2. In addition, in FIGS. 5A and 5B, the carriage 18 on which the printing head 19 is mounted is not illustrated. The printing head 19 and the platen 40 illustrated in FIG. 5A and the printing head 19 and the platen 40 illustrated in FIG. 5B are the same items.

The reference characters 27*a*, 27*b*, 27*c*, 27*d*, and 27*e* in the printing head 19 in FIG. 5A represents nozzle areas 27*a*, 27*b*, 27*c*, 27*d*, and 27*e* that can be used in marginless printing performed to the downstream end portion of the printing medium 30. The nozzle areas 27*a*, 27*b*, 27*c*, 27*d*, and 27*e* are spaced apart from each other in the transport direction D2, and each of them is a partial area of the nozzle row 26. The nozzle areas 27*a*, 27*b*, 27*c*, 27*d*, and 27*e* are examples of the plurality of nozzle areas respectively corresponding to the plurality of non-contact portions 42 in the transport direction D2, and are set in advance on the basis of a positional relationship between the platen 40 and the nozzle row 26 in the transport direction D2.

The nozzle area 27*a* is a nozzle area used in marginless printing performed to the downstream end portion in a state where the downstream end 31 of the printing medium 30 is positioned at the first groove 42*a*1 as illustrated in FIG. 5A.

Furthermore, the nozzle area 27*b* is a nozzle area used in marginless printing performed to the downstream end portion in a state where the downstream end 31 is positioned at the first groove 42*a*2.

Furthermore, the nozzle area 27*c* is a nozzle area used in marginless printing performed to the downstream end portion in a state where the downstream end 31 is positioned at the first groove 42*a*3.

Furthermore, the nozzle area 27*d* is a nozzle area used in marginless printing performed to the downstream end portion in a state where the downstream end 31 is positioned at the first groove 42*a*4.

Furthermore, the nozzle area 27*e* is a nozzle area used in marginless printing performed to the downstream end portion in a state where the downstream end 31 is positioned at the first groove 42*a*5.

The reference characters 28*a*, 28*b*, 28*c*, 28*d*, and 28*e* in FIG. 5B represent nozzle areas 28*a*, 28*b*, 28*c*, 28*d*, and 28*e* that can be used in marginless printing performed to the upstream end portion of the printing medium 30. The nozzle areas 28*a*, 28*b*, 28*c*, 28*d*, and 28*e* are also spaced apart from each other in the transport direction D2, and each of them is a partial area of the nozzle row 26. The nozzle areas 28*a*, 28*b*, 28*c*, 28*d*, and 28*e* are examples of the plurality of nozzle areas respectively corresponding to the plurality of non-contact portions 42 in the transport direction D2, and are set in advance on the basis of a positional relationship between the platen 40 and the nozzle row 26 in the transport direction D2.

The nozzle area 28*a* is a nozzle area used in marginless printing performed to the upstream end portion in a state where the upstream end 32 of the printing medium 30 is positioned at the first groove 42*a*1.

Furthermore, the nozzle area 28*b* is a nozzle area used in marginless printing performed to the upstream end portion in a state where the upstream end 32 is positioned at the first groove 42*a*2.

Furthermore, the nozzle area 28*c* is a nozzle area used in marginless printing performed to the upstream end portion in a state where the upstream end 32 is positioned at the first groove 42*a*3.

Furthermore, the nozzle area 28*d* is a nozzle area used in marginless printing performed to the upstream end portion in a state where the upstream end 32 is positioned at the first groove 42*a*4.

Furthermore, the nozzle area 28*e* is a nozzle area used in marginless printing performed to the upstream end portion in a state where the upstream end 32 is positioned at the first groove 42*a*5 as illustrated in FIG. 5B.

Each position of the nozzle areas 27*a*, 27*b*, 27*c*, 27*d*, 27*e*, 28*a*, 28*b*, 28*c*, 28*d*, and 28*e* may be understood to be common to the nozzle rows 26C, 26M, 26Y, and 26K that correspond to individual ink colors.

The first groove 42*a*1 corresponds to the nozzle area 27*a* and the nozzle area 28*a*, and receives the ink discarded at the time of performing the marginless printing to the downstream end portion of the printing medium 30 using the nozzle area 27*a*, or at the time of performing the marginless printing to the upstream end portion of the printing medium 30 using the nozzle area 28*a*. Similarly, the first groove 42*a*2 corresponds to the nozzle area 27*b* and the nozzle area 28*b*.

The first groove 42_a_3 corresponds to the nozzle area 27_c_ and the nozzle area 28_c_. The first groove 42_a_4 corresponds to the nozzle area 27_d_ and the nozzle area 28_d_. The first groove 42_a_5 corresponds to the nozzle area 27_e_ and the nozzle area 28_e_. FIGS. 5A and 5B illustrate an example in which deposits 50 due to the discarded ink exist on the ink absorbing body 43 in the first groove 42_a_5. Although illustration is not given, there is a possibility that deposits 50 are also accumulated within the other first grooves 42_a_1, 42_a_2, 42_a_3, and 42_a_4.

Figure 6:
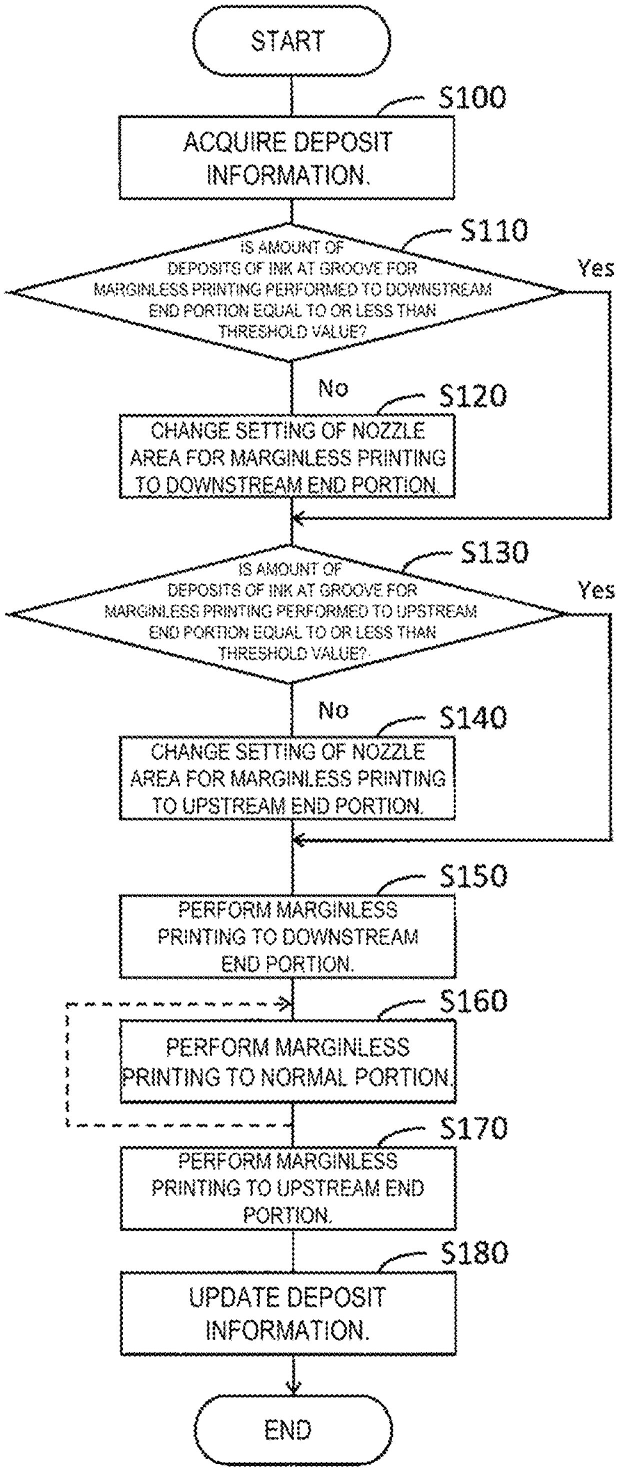
FIG. 6 is a flowchart showing a printing control process according to a first embodiment in a marginless printing mode.

3. First Embodiment:

A user can select any one of a margin-leaving printing mode and a marginless printing mode through operation performed to the operation reception portion 14. Here, it is assumed that the marginless printing mode has been selected. FIG. 6 illustrates a flowchart of a printing control process according to the first embodiment performed by the control unit 11 in accordance with the program 12 in the marginless printing mode.

In step S100, the control unit 11 acquires, from a predetermined memory, deposit information indicating the amount of deposits of the ink at the non-contact portion 42. The deposit information is information directly or indirectly indicating the amount of deposits 50 at the non-contact portion 42. The information indirectly indicating the amount of deposits 50 is information with which the amount of deposits 50 can be estimated to some degree. The control unit 11 manages the deposit information stored in a predetermined memory while updating it at least for each of the first grooves 42_a_. The update of the deposit information is performed at the timing of S180 when the marginless printing in steps S150 to S170 ends.

In step S110, the control unit 11 determines whether or not the amount of deposits of the ink at the first groove 42_a_ (hereinafter, referred to as a "first groove for a downstream end portion") that is currently set as the first groove 42_a_ for marginless printing performed to the downstream end portion of the printing medium 30 is equal to or less than a predetermined threshold value. If the first groove 42_a_1 is a first groove for a downstream end portion, the control unit 11 compares the threshold value with the amount of deposits of the ink indicated by the deposit information about the first groove 42_a_1. The threshold value used in step S110 or step S130 that will be described later is a value directly or indirectly indicating the amount of deposits 50 that is determined in advance and that does not reach the printing medium 30 supported by the contact portion 41.

When the amount of deposits of the ink at the first groove for a downstream end portion is equal to or less than the threshold value, the control unit 11 proceeds from the determination of "Yes" in step S110 to step S130. On the other hand, when the amount of deposits of the ink at the first groove for a downstream end portion exceeds the threshold value, the control unit 11 proceeds from the determination of "No" in step S110 to step S120.

In step S120, the control unit 11 changes a setting of a nozzle area (hereinafter, referred to as a "nozzle area for a downstream end portion") for marginless printing performed to the downstream end portion, and proceeds to step S130. For example, the setting of the nozzle area for a downstream end portion is changed from the current nozzle area 27_a_ to the nozzle area 27_b_. The correspondence relationship between the nozzle area for marginless printing and the first groove 42_a_ is determined as described using the example of FIGS. 5A and 5B. Thus, the control unit 11 also changes the setting of the first groove for a downstream end portion in conjunction with the change of the setting of the nozzle area for a downstream end portion. When the setting of the nozzle area for a downstream end portion is changed from the nozzle area 27_a_ to the nozzle area 27_b_ as described above, the setting of the first groove for a downstream end portion is changed from the first groove 42_a_1 corresponding to the nozzle area 27_a_ into the first groove 42_a_2 corresponding to the nozzle area 27_b_.

In step S130, the control unit 11 determines whether or not the amount of deposits of the ink at the first groove 42_a_ (hereinafter, referred to as a "first groove for an upstream end portion") that is currently set as the first groove 42_a_ for marginless printing performed to the upstream end portion of the printing medium 30 is equal to or less than the predetermined threshold value. If the first groove 42_a_5 is the first groove for an upstream end portion, the control unit 11 compares the threshold value with the amount of deposits of the ink indicated by the deposit information about the first groove 42_a_5. When the amount of deposits of the ink at the first groove for an upstream end portion is equal to or less than the threshold value, the control unit 11 proceeds from the determination of "Yes" in step S130 to step S150. On the other hand, when the amount of deposits of the ink at the first groove for an upstream end portion exceeds the threshold value, the control unit 11 proceeds from the determination of "No" in step S130 to step S140.

In step S140, the control unit 11 changes the setting of the nozzle area (hereinafter, referred to as a "nozzle area for an upstream end portion") for marginless printing performed to the upstream end portion, and proceeds to step S150. For example, the setting of the nozzle area for an upstream end portion is changed from the current nozzle area 28_e_ to the nozzle area 28_d_. Naturally, the control unit 11 also changes the setting of the first groove for an upstream end portion in conjunction with the change of the setting of the nozzle area for an upstream end portion. When the setting of the nozzle area for an upstream end portion is changed from the nozzle area 28_e_ into the nozzle area 28_d_ as described above, the setting of the first groove for an upstream end portion is changed from the first groove 42_a_5 corresponding to the nozzle area 28_e_ into the first groove 42_a_4 corresponding to the nozzle area 28_d_.

In this manner, with steps S110 to S140, the control unit 11 changes the area of the nozzle used in marginless printing to any of the plurality of nozzle areas respectively corresponding to the plurality of non-contact portions 42 in the transport direction D2, this changing being made in accordance with the deposit information indicating the amount of deposits of the ink at the non-contact portion 42.

Here, some specific examples of the deposit information will be described.

The deposit information represents, for example, the amount of discharged ink calculated on the basis of print data used to perform the marginless printing. As a precondition for starting the flowchart in FIG. 6, a print job has already been inputted into the control unit 11 by the user through operation performed to the operation reception portion 14 or communication with the outside via the communication IF 15. The print job not only includes print data for expressing an image to be printed on the printing medium 30 but also includes various types of setting information concerning printing such as the number of copies of printing or the like.

The print data expresses an image for each page to be printed on the printing medium 30 by using a plurality of pixels arrayed in a two-dimensional manner. For each of the pixels, definition as to discharging (dot ON) of dots or not discharging (dot OFF) of dots are set for each ink color such as CMYK. Thus, in a more simplified sense, the number of dot ON (number of dots) defined in the print data can be understood to be the amount of discharged ink based on the print data.

Figure 7:
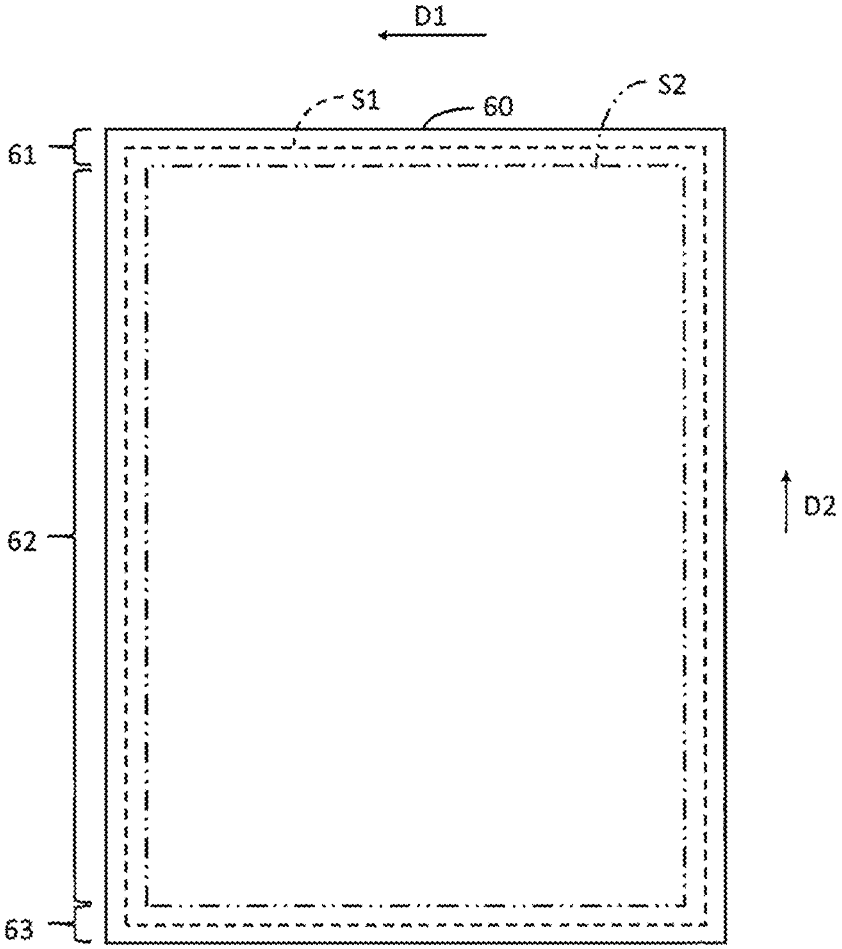
FIG. 7 is a diagram showing a relationship between the size on print data and a medium size in the marginless printing mode.

FIG. 7 illustrates an example of a relationship between the size of one page on the print data 60 in the marginless printing mode and the medium size S1 that is the size of the printing medium 30. FIG. 7 also illustrates a correspondence relationship between the platen data 60 or the like and each of the directions D1 and D2. It is known that the print data 60 used in the marginless printing mode is generated to have a size slightly larger than the medium size S1 in both the vertical direction and the horizontal direction. In FIG. 7, a margin-leaving printing size S2 is illustrated by a rectangle with the dash-dot-dot line at the inner side of the medium size S1 illustrated by a rectangle with the dashed line, for the reference purpose. The size on the print data used in the margin-leaving printing mode is the margin-leaving printing size S2. In FIG. 7, the region between the margin-leaving printing size S2 and the medium size S1 corresponds to end portions of the printing medium 30, that is, the downstream end portion, the upstream end portion, the right end portion, and the left end portion.

The print data 60 can be divided into print data 63 about an upstream end portion, print data 62 about a normal portion, print data 61 about a downstream end portion, from the upstream side to the downstream side along the transport direction D2. The print data 61 about a downstream end portion is data used in marginless printing performed to the downstream end portion of the printing medium 30, and defines dots discharged to the downstream end portion and dots discarded to the outside of the downstream end portion. The print data 63 about an upstream end portion is data used in marginless printing performed to the upstream end portion of the printing medium 30, and defines dots discharged to the upstream end portion and dots discarded to the outside of the upstream end portion. The print data 62 about a normal portion is a portion of the print data 60 excluding the print data 61 about a downstream end portion and the print data 63 about an upstream end portion.

Thus, when marginless printing based on the print data 60 is performed on one sheet of printing medium 30 in a state where the first groove for a downstream end portion is set to a certain first groove 42*a*, the control unit 11 adds the number of dots in the print data 61 about a downstream end portion to the deposit information (the number of dots) about this first groove 42*a* until this time, thereby updating the deposit information about this first groove 42*a*. Alternatively, the control unit 11 may update the deposit information about this first groove 42*a* by using the number of dots discarded to the outside of the downstream end portion among the number of dots in the print data 61 about a downstream end portion.

Similarly, when marginless printing based on the print data 60 is performed on one sheet of printing medium 30 in a state where the first groove for an upstream end portion is set to a certain first groove 42*a*, the control unit 11 adds the number of dots in the print data 63 about an upstream end portion to the deposit information (the number of dots) about this first groove 42*a* until this time, thereby updating the deposit information about this first groove 42*a*. Alternatively, the control unit 11 may update the deposit information about this first groove 42*a* by using the number of dots discarded to the outside of the upstream end portion among the number of dots in the print data 63 about an upstream end portion.

As can be understood from the description above, one first groove 42*a* can be a first groove for a downstream end portion or can be a first groove for an upstream end portion. Thus, the deposit information about the first groove 42*a* is the sum of the deposit information corresponding to marginless printing performed to the downstream end portion during a period of time in which this first groove 42*a* has been set as the first groove for a downstream end portion until this time and the deposit information corresponding to marginless printing performed to the upstream end portion during a period of time in which this first groove 42*a* has been set as the first groove for an upstream end portion until this time.

Thus, in step S110, it is only necessary that the control unit 11 compares the predetermined threshold value concerning the number of dots with the number of dots indicated by the deposit information about the first groove 42*a* corresponding to the first groove for a downstream end portion. In addition, in step S130, it is only necessary that the control unit 11 compares the predetermined threshold value concerning the number of dots with the number of dots indicated by the deposit information about the first groove 42*a* corresponding to the first groove for an upstream end portion.

Note that it may be possible to employ a configuration in which each of the nozzles 20 of the printing head 19 can discharge dots with a plurality of sizes of which size per drop differ from each other, and the dots include a large dot, a middle dot, and a small dot. In other words, the print data 60 may be data for defining any of a large dot ON, a middle dot ON, a small dot ON, and a dot OFF for each pixel and for each ink color. In such a case, the control unit 11 counts the number of dots in accordance with the ratio of the dot size to calculate the amount of discharged ink on the basis of the print data 60. For example, when the control unit 11 counts one large dot as one piece, it is only necessary that the control unit 11 counts one middle dot as 0.5 piece, or counts one small dot as 0.25 piece.

Alternatively, the deposit information may be the number of printing sheets of marginless printing. In other words, the deposit information about one first groove 42*a* is the sum of the number of printing sheets of marginless printing during a period of time in which this first groove 42*a* has been set as the first groove for a downstream end portion until this time and the number of printing sheets of marginless printing during a period of time in which this first groove 42*a* has been set as the first groove for an upstream end portion until this time.

Furthermore, in step S110, it is only necessary that the control unit 11 compares a predetermined threshold value concerning the number of printing sheets with the number of printing sheets of marginless printing indicated by the deposit information about the first groove 42*a* corresponding to the first groove for a downstream end portion. In addition, in step S130, it is only necessary that the control unit 11 compares a predetermined threshold value concerning the number of printing sheets with the number of printing sheets of marginless printing indicated by the deposit information about the first groove 42*a* corresponding to the first groove for an upstream end portion.

Alternatively, the deposit information may be the height of deposits 50 of the ink at the non-contact portion 42. Here, the sensor 22 includes one type of distance-measuring sensor, and can measure the height, from the ink absorbing body 43, of the deposits 50 accumulating on the ink absorbing body 43 at each of the first grooves 42*a*1, 42*a*2, 42*a*3, 42*a*4, and 42*a*5.

In addition, in step S110, it is only necessary that the control unit 11 compares a predetermined threshold value concerning the height of the deposits 50 with the height of the deposits 50 indicated by the deposit information about the first groove 42*a* corresponding to the first groove for a downstream end portion. Furthermore, in step S130, it is only necessary that the control unit 11 compares the predetermined threshold value concerning the height of the deposits 50 with the height of the deposits 50 indicated by the deposit information about the first groove 42*a* corresponding to the first groove for an upstream end portion.

Alternatively, the deposit information may be the weight of the deposits 50 of the ink at the non-contact portion 42. Here, the sensor 22 include one type of a weight sensor, and can measure the weight of the deposits 50 accumulating on the ink absorbing body 43 at each of the first grooves 42*a*1, 42*a*2, 42*a*3, 42*a*4, and 42*a*5.

In addition, in step S110, it is only necessary that the control unit 11 compares a predetermined threshold value concerning the weight of the deposits 50 with the weight of the deposits 50 indicated by the deposit information about the first groove 42*a* corresponding to the first groove for a downstream end portion. Furthermore, in step S130, it is only necessary that the control unit 11 compares the predetermined threshold value concerning the weight of the deposits 50 with the weight of the deposits 50 indicated by the deposit information about the first groove 42*a* corresponding to the first groove for an upstream end portion.

In step S150, the control unit 11 controls the transport unit 17, the carriage 18, and the printing head 19 to perform the marginless printing to the downstream end portion. First, the control unit 11 causes the transport unit 17 to transport the printing medium 30 so that the downstream end 31 of the printing medium 30 reaches a predetermined location at the first groove for a downstream end portion. Transport of the printing medium 30 in step S150 is also referred to as "indexing." As a result of indexing, the downstream end 31 is positioned at the first groove for a downstream end portion. The printing unit 16 includes a medium detecting sensor at a position disposed upstream of the printing head 19 in a transport path for the printing medium 30, and the medium detecting sensor can detect the printing medium 30. The medium detecting sensor is one type of the sensor 22. Thus, the control unit 11 can always obtain positions of the downstream end 31 and the upstream end 32 of the printing medium 30 in the transport direction D2, on the basis of results of detection of the medium by the medium detecting sensor and the amount of transport by the transport unit 17.

Next, the control unit 11 causes the carriage 18 to move along the main scanning direction D1 and also causes each of the nozzles 20 in the nozzle area for a downstream end portion of the printing head 19 to drive on the basis of the print data 61 about a downstream end portion, thereby causing the ink to be discharged to the downstream end portion of the printing medium 30 and to the outside thereof. This achieves marginless printing to the downstream end portion. Note that the pass for performing the marginless printing to the downstream end portion and the pass for performing the marginless printing to the upstream end portion may be each performed one time or may be each performed a plurality of times.

After marginless printing is performed to the downstream end portion, the control unit 11 controls the transport unit 17, the carriage 18, and the printing head 19 in step S160 to perform the marginless printing to the normal portion of the printing medium 30. The normal portion of the printing medium 30 is a portion of the printing medium 30 that excludes the downstream end portion and the upstream end portion. As indicated by the arrow with the dashed line in FIG. 6, the control unit 11 repeats marginless printing to the normal portion in conjunction with a predetermined amount of paper feed and the predetermined number of times of pass. The marginless printing performed to the normal portion is printing on the basis of the print data 62 about a normal portion, and naturally involves discarding the ink to the outside at the right end of the printing medium 30 or to the outside at the left end of the printing medium 30. The nozzle area used in marginless printing performed to the normal portion is not particularly limited, and for example, may be the entire nozzle row 26.

After the marginless printing is performed to the normal portion, the control unit 11 controls the transport unit 17, the carriage 18, and the printing head 19 in step S170 to perform the marginless printing to the upstream end portion. First, the control unit 11 causes the transport unit 17 to transport the printing medium 30 so that the upstream end 32 of the printing medium 30 reaches a predetermined location at the first groove for an upstream end portion. Transport of the printing medium 30 in step S170 may be also referred to as "final paper feed of this printing medium 30." With this operation, the upstream end 32 is positioned at the first groove for an upstream end portion. Next, the control unit 11 causes the carriage 18 to move along the main scanning direction D1 and causes each of the nozzles 20 in the nozzle area for an upstream end portion of the printing head 19 to drive on the basis of the print data 63 about an upstream end portion, thereby causing the ink to be discharged to the upstream end portion of the printing medium 30 and to the outside thereof. This achieves marginless printing to the upstream end portion.

After marginless printing is performed to the upstream end portion, the control unit 11 updates the deposit information in step S180. That is, the deposit information about the first groove 42*a* corresponding to the first groove for a downstream end portion is updated on the basis of information such as the print data 61 about a downstream end portion used in marginless printing performed to the downstream end portion in step S150 or the number of pages in the print data 60 within a print job or the number of copies of printing of each page. Similarly, the deposit information about the first groove 42*a* corresponding to the first groove for an upstream end portion is updated on the basis of information such as the print data 63 about an upstream end portion used in marginless printing performed to the upstream end portion in step S170 or the number of pages in the print data 60 within a print job or the number of copies of printing of each page.

Alternatively, in step S180, the control unit 11 causes the sensor 22 to measure the height or the weight of the deposits 50 at the first groove 42*a* corresponding to the first groove for a downstream end portion or at the first groove 42*a* corresponding to the first groove for an upstream end portion. After this, by using these measurement results, the deposition information such as the height or the weight of the deposits 50 at the first groove 42*a* in question is updated.

Then, the flowchart in FIG. 6 ends. Note that, although no particular illustration is given in FIG. 6, it is only necessary that, in parallel with step S180, the control unit 11 causes the transport unit 17 to perform transport to emit the printing medium 30 that has been subjected to step S170.

For example, when a print job is inputted as a job for which marginless printing is to be performed, the control unit 11 performs the flowchart in FIG. 6 for every print job. That is, determination in step S110 or step S130 is performed one time for each print job. Alternatively, the control unit 11 may perform the flowchart in FIG. 6 for every page in the print data. In other words, when the print data included in the print job expresses an image with a plurality of pages, determination in step S110 or step S130 is performed every time printing of one page is performed.

Various ideas can be considered as to the order of changing nozzle areas for a downstream end portion in step S120 and the order of changing nozzle areas for an upstream end portion in step S140.

For example, at the time of product shipment, the control unit 11 may set the nozzle area 27*a* disposed at the most downstream side as the initial setting of a nozzle area for a downstream end portion. Then, this initial setting may be changed in step S120 in the order of the nozzle area 27*a*— the nozzle area 27*b*— the nozzle area 27*c*— the nozzle area 27*d*— the nozzle area 27*e* every time "No" is determined in step S110. In addition, at the time of product shipment, the control unit 11 may set the nozzle area 28*e* disposed at the most upstream side as the initial setting of a nozzle area for an upstream end portion. Then, this initial setting may be changed in step S140 in the order of the nozzle area 28*e*— the nozzle area 28*d*— the nozzle area 28*c*— the nozzle area 28*b*— the nozzle area 28*a* every time "No" is determined in step S130.

Alternatively, the control unit 11 may set the initial setting of a nozzle area for a downstream end portion at the time of product shipment and the initial setting of a nozzle area for an upstream end portion at the time of product shipment, to be in a relationship between nozzle areas corresponding to a common first groove 42*a*. For example, the initial setting of a nozzle area for a downstream end portion at the time of product shipment is set to be the nozzle area 27*a* corresponding to the first groove 42*a*1 disposed at the most downstream side, whereas the initial setting of a nozzle area for an upstream end portion at the time of product shipment is set to be the nozzle area 28*a* corresponding to the same first groove 42*a*1. In addition, the control unit 11 changes each of the nozzle area for a downstream end portion and the nozzle area for an upstream end portion in the order such that the first grooves 42*a* corresponding to them are common to each other. With this configuration, determination in step S110 is substantially the same as determination in step S130. This makes it possible to decide whether or not to change each of the nozzle area for a downstream end portion and the nozzle area for an upstream end portion, on the basis of only determination in step S110. Thus, it is possible to keep a state in which the first groove 42*a* corresponding to the nozzle area for a downstream end portion and the first groove 42*a* corresponding to the nozzle area for an upstream end portion are common to each other.

Alternatively, the nozzle area for a downstream end portion may be changed in a random order in step S120, or the nozzle area for an upstream end portion may be changed in a random order in step S140. That is, in step S120, it is only necessary that the control unit 11 makes a change into a nozzle area differing from the previously set nozzle area for a downstream end portion, among the nozzle areas 27*a*, 27*b*, 27*c*, 27*d*, and 27*e* that can be used as the nozzle area for a downstream end portion. Similarly, in step S140, it is only necessary that the control unit 11 makes a change into a nozzle area differing from the previously set nozzle area for an upstream end portion, among the nozzle areas 28*a*, 28*b*, 28*c*, 28*d*, and 28*e* that can be used as the nozzle area for an upstream end portion.

In this manner, with the first embodiment, the printing apparatus 10 includes: the platen 40 configured to support the printing medium 30; the transport unit 17 configured to transport the printing medium 30 in the transport direction D2; the printing head 19 including a plurality of nozzles 20 configured to discharge ink to the printing medium 30 supported by the platen 40; the scanning portion configured to move the printing head 19 in the main scanning direction D1 intersecting the transport direction D2; and the control unit 11 configured to control the transport unit 17, the printing head 19, and the scanning portion. The platen 40 includes: the plurality of contact portions 41 configured to be brought into contact with the printing medium 30 to support the printing medium 30; and the plurality of non-contact portions 42 configured not to be brought into contact with the printing medium 30. The plurality of contact portions 41 are disposed at positions differing from each other in the transport direction D2, and are each provided between the non-contact portions 42. In addition, when marginless printing in which ink is discharged to an end portion, in the transport direction D2, of the printing medium 30 is performed, the control unit 11 changes areas of the nozzles used in the marginless printing to any of a plurality of nozzle areas corresponding respectively to the plurality of non-contact portions 42 in the transport direction D2, the control unit 11 changing the areas in accordance with deposit information indicating the amount of the ink deposited at the non-contact portions 42.

With the configuration described above, a nozzle area used in the marginless printing is changed in accordance with the deposit information at the non-contact portion 42. This makes it possible to suppress growth of the deposits 50 of the ink at each of the non-contact portions 42. Thus, it is possible to prolong a period of time in which the deposits 50 are not brought into contact with the printing medium 30, which makes it possible to increase the service life of a product. Note that, from the viewpoint of a type of the ink, when a dye ink and a pigment ink are mixed, this may lead to gelatinization, and the deposits 50 are more likely to remain on the ink absorbing body 43. Thus, it can be said that the present embodiment effectively works especially when a pigment ink is used or when a pigment ink is used for a portion of an ink color from among a plurality of ink colors and a dye ink is used for the rest of the ink colors.

In addition, with the first embodiment, the deposition information may be the amount of discharged ink calculated on the basis the print data for marginless printing.

With this configuration, even in a situation where the amount of deposits of the ink at the non-contact portion 42 cannot be directly measured, it is possible to change the nozzle area used in the marginless printing at appropriate timing by estimating the amount of deposits of the ink using the amount of discharged ink calculated on the basis of the print data.

In addition, with the first embodiment, the deposit information may be the number of printing sheets in the marginless printing.

With this configuration, by estimating the amount of deposits of the ink on the basis of the number of sheets of marginless printing that is information that can be easily obtained, it is possible to change the nozzle area used in the marginless printing at appropriate timing.

In addition, with the first embodiment, the deposit information may be the height of the deposits 50 of the ink at the non-contact portion 42. Alternatively, the deposit information may be the weight of the deposits 50 of the ink at the non-contact portion 42.

With these configurations, it is possible to directly obtain the amount of deposits of the ink at the non-contact portion 42 to change the nozzle area used in the marginless printing at appropriate timing.

In addition to the printing apparatus and the printing system, the present embodiment discloses various categories of invention such as a printing method or a program 12 that causes a processor to execute the printing method.

The printing method includes discharging ink to the printing medium 30 supported by the platen 40 to perform printing by using a combination of transport of the printing medium 30 in a transport direction D2 and main scanning for moving the printing head 19 in the main scanning direction D1 intersecting the transport direction D2, the printing head including a plurality of nozzles 20 configured to discharge the ink, in which the platen 40 includes: the plurality of contact portions 41 configured to be bought into contact with the printing medium 30 to support the printing medium 30; and the plurality of non-contact portions 42 configured not to be brought into contact with the printing medium 30, the plurality of contact portions 41 of which positions differ from each other in the transport direction D2 are each provided between the non-contact portions 42, and when marginless printing in which ink is discharged to an end portion, in the transport direction D2, of the printing medium 30 is performed, areas of the nozzles used in the marginless printing are changed to any of a plurality of nozzle areas corresponding respectively to the plurality of non-contact portions 42 in the transport direction D2, the change being made in accordance with deposit information indicating the amount of the ink deposited at the non-contact portions 42.

4. Second Embodiment:

Next, a second embodiment will be described. In the second embodiment, description will be made of portions differing from those in the embodiment that has been described above.

Figure 8:
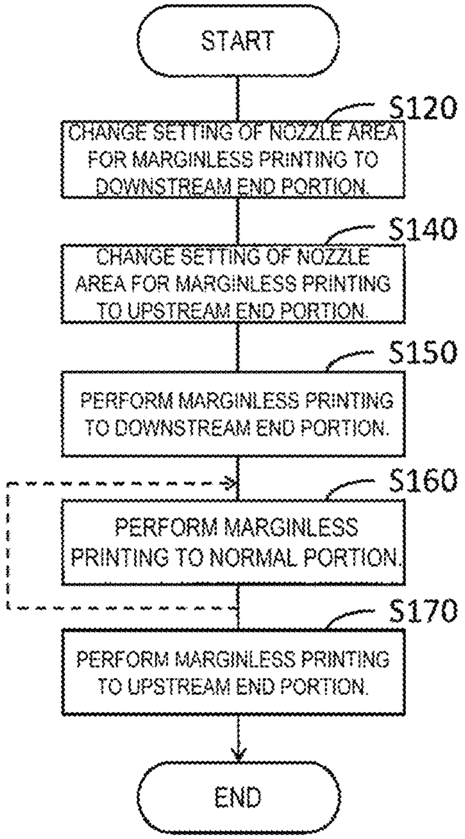
FIG. 8 is a flowchart showing a printing control process according to a second embodiment in the marginless printing mode.

FIG. 8 illustrates a flowchart showing a printing control process according to the second embodiment executed by the control unit 11 in accordance with the program 12 in the marginless printing mode. As compared with FIG. 6, there are no step S100, S110, S130, or S180 in FIG. 8. In the second embodiment, the control unit 11 performs the processes in FIG. 8 for each page that constitutes the print data. That is, when marginless printing in which ink is discharged to an end portion, in the transport direction D2, of the printing medium 30 is performed, areas of the nozzles used in the marginless printing are changed to any of a plurality of nozzle areas corresponding respectively to the plurality of non-contact portions 42 in the transport direction D2, the change being made for each page to be printed.

In this manner, in the second embodiment, the control unit 11 performs steps S120 and S140 before marginless printing (steps S150 to S170) based on the print data for one page is performed. Thus, as illustrated in FIGS. 5A and 5B as an example, it is assumed that there are five nozzle areas that can serve as a nozzle area for a downstream end portion, and there are five nozzle areas that can serve as a nozzle area for an upstream end portion. In this case, when five pages of printing are basically performed, the five nozzle areas that can be used as the nozzle area for a downstream end portion and the five nozzle areas that can be used as the nozzle area for an upstream end portion are all used one time. In other words, the control unit 11 changes each of the nozzle areas for an upstream end portion and the nozzle areas for a downstream end portion for each of the pages, and for example, repeatedly uses the five nozzle areas for each of the portions in sequence.

With the second embodiment as described above, by changing the nozzle areas used in marginless printing for each of the pages to be printed, it is possible to flatten the growth of the deposits 50 of the ink at each of the non-contact portions 42, and to avoid a situation in which the deposits 50 at some portions of the non-contact portions 42 are particularly large. Thus, it is possible to prolong a period of time in which the deposits 50 are not brought into contact with the printing medium 30, which makes it possible to increase the service life of a product.

The printing method includes discharging ink to the printing medium 30 supported by the platen 40 to perform printing by using a combination of transport of the printing medium 30 in the transport direction D2 and main scanning for moving the printing head 19 in the main scanning direction D1 intersecting the transport direction D2, the printing head including a plurality of nozzles 20 configured to discharge the ink, in which the platen 40 includes: the plurality of contact portions 41 configured to be bought into contact with the printing medium 30 to support the printing medium 30; and the plurality of non-contact portions 42 configured not to be brought into contact with the printing medium 30, the plurality of contact portions 41 of which positions differ from each other in the transport direction D2 are each provided between the non-contact portions 42, and when marginless printing in which ink is discharged to an end portion, in the transport direction D2, of the printing medium 30 is performed, areas of the nozzles used in the marginless printing are changed to any of a plurality of nozzle areas corresponding respectively to the plurality of non-contact portions 42 in the transport direction D2, the change being made for each page to be printed.

In the second embodiment, at the time of performing the marginless printing to one page, that is, performing the marginless printing to one sheet of printing medium 30, the control unit 11 may change, for each printing page, the nozzle area for a downstream end portion and the nozzle area for an upstream end portion in a state in which the nozzle area for a downstream end portion and the nozzle area for an upstream end portion maintain a relationship in which the first grooves 42*a* corresponding to them are common to each other. With this configuration, the ink is discarded to the first groove for a downstream end portion from the nozzle 20 in the nozzle area for a downstream end portion at the time of performing the marginless printing to the downstream end portion of the printing medium 30, and the ink is discarded from the nozzle 20 in the nozzle area for an upstream end portion to the first groove for an upstream end portion that is also the first groove for a downstream end portion at the time of performing the marginless printing to the upstream end portion of the same printing medium 30. Thus, in terms of characteristics of the ink, before the ink that has been discarded to the ink absorbing body 43 becomes dry, a new ink is discarded onto the same ink absorbing body 43. Thus, when the ink has an effect in which the ink is easily absorbed by the ink absorbing body 43, it is possible to slow the growth of the deposits 50.

Alternatively, in the second embodiment, the control unit 11 may change, for each printing page, the nozzle area for a downstream end portion and the nozzle area for an upstream end portion in a state in which, in marginless printing performed for one page, the nozzle area for a downstream end portion and the nozzle area for an upstream end portion maintain a relationship in which the first grooves 42*a* corresponding to them are different from each other. With this configuration, at the time of performing the marginless printing to the downstream end portion of the printing medium 30, the ink is discarded to the first groove for a downstream end portion from the nozzle 20 in the nozzle area for a downstream end portion. In addition, at the time of performing the marginless printing to the upstream end portion of the same printing medium 30, the ink is discarded from the nozzle 20 in the nozzle area for an upstream end portion to the first groove for an upstream end portion that is different from the first groove for a downstream end portion. Thus, in terms of characteristics of the ink, after the ink that has been discarded to the ink absorbing body 43 becomes dry, a new ink is discarded onto the same ink absorbing body 43. Thus, when the ink has an effect in which the ink is easily absorbed by the ink absorbing body 43, it is possible to slow the growth of the deposits 50.

What is claimed is:

1. A printing apparatus comprising:

a platen configured to support a printing medium;

a transport unit configured to transport the printing medium in a transport direction;

a printing head including a plurality of nozzles configured to discharge ink to the printing medium supported by the platen;

a scanning portion configured to move the printing head in a main scanning direction intersecting the transport direction; and a control unit configured to control the transport unit, the printing head, and the scanning portion, wherein the platen includes:

a plurality of contact portions configured to be brought into contact with the printing medium to support the printing medium; and a plurality of non-contact portions configured not to be brought into contact with the printing medium, each of the non-contact portions comprising a first groove that is parallel to the main scanning direction, the plurality of the contact portions of which positions differ from each other in the transport direction are each provided between the non-contact portions, one contact portion of the plurality of the contact portions being encircled by a plurality of the plurality of first grooves in the transport direction, each of the plurality of the first grooves accommodating an ink absorbing body, and when performing marginless printing for discharging ink to an end portion, in the transport direction, of the printing medium, the control unit changes areas of the nozzles used in the marginless printing to any of a plurality of nozzle areas corresponding respectively to the plurality of first grooves in the transport direction in accordance with deposit information indicating an amount of the ink deposited at the first groove.

2. The printing apparatus according to claim 1, wherein the deposit information is an amount of discharged ink calculated on a basis of print data for the marginless printing.

3. The printing apparatus according to claim 1, wherein the deposit information is the number of printing sheets of the marginless printing.

4. The printing apparatus according to claim 1, wherein the deposit information is a height of deposited ink at the non-contact portions.

5. The printing apparatus according to claim 1, wherein the deposit information is a weight of deposited ink at the non-contact portions.

6. The printing apparatus according to claim 1, wherein the control unit changes areas of the nozzles based upon stored deposit information indicating the amount of the ink already deposited at the non-contact portions and a threshold valve for the amount of ink deposited at the non-contact portions.

7. A printing method of discharging ink to a printing medium supported by a platen to perform printing by using a combination of transport of the printing medium in a transport direction and main scanning for moving a printing head in a main scanning direction intersecting the transport direction, the printing head including a plurality of nozzles configured to discharge the ink, wherein the platen includes:

a plurality of contact portions configured to be brought into contact with the printing medium to support the printing medium; and a plurality of non-contact portions configured not to be brought into contact with the printing medium, each non-contact portion of the plurality of non-contact portions comprising a first groove that is parallel to the main scanning direction, the plurality of the contact portions of which positions differ from each other in the transport direction are each provided between the non-contact portions, one contact portion of the plurality of the contact portions being encircled by a plurality of the first grooves in the transport direction, each of the plurality of the first grooves accommodating an ink absorbing body, and when marginless printing for discharging ink to an end portion, in the transport direction, of the printing medium is performed, areas of the nozzles used in the marginless printing are changed to any of a plurality of nozzle areas corresponding respectively to the plurality first grooves in the transport direction, the change being made in accordance with deposit information indicating an amount of the ink deposited at the first groove.

8. The printing method according to claim 7, further comprising changing areas of the nozzles based upon stored deposit information indicating the amount of the ink already deposited at the non-contact portions and a threshold valve for the amount of ink deposited at the non-contact portions.

* * * * *